UNITED STATES PATENT OFFICE.

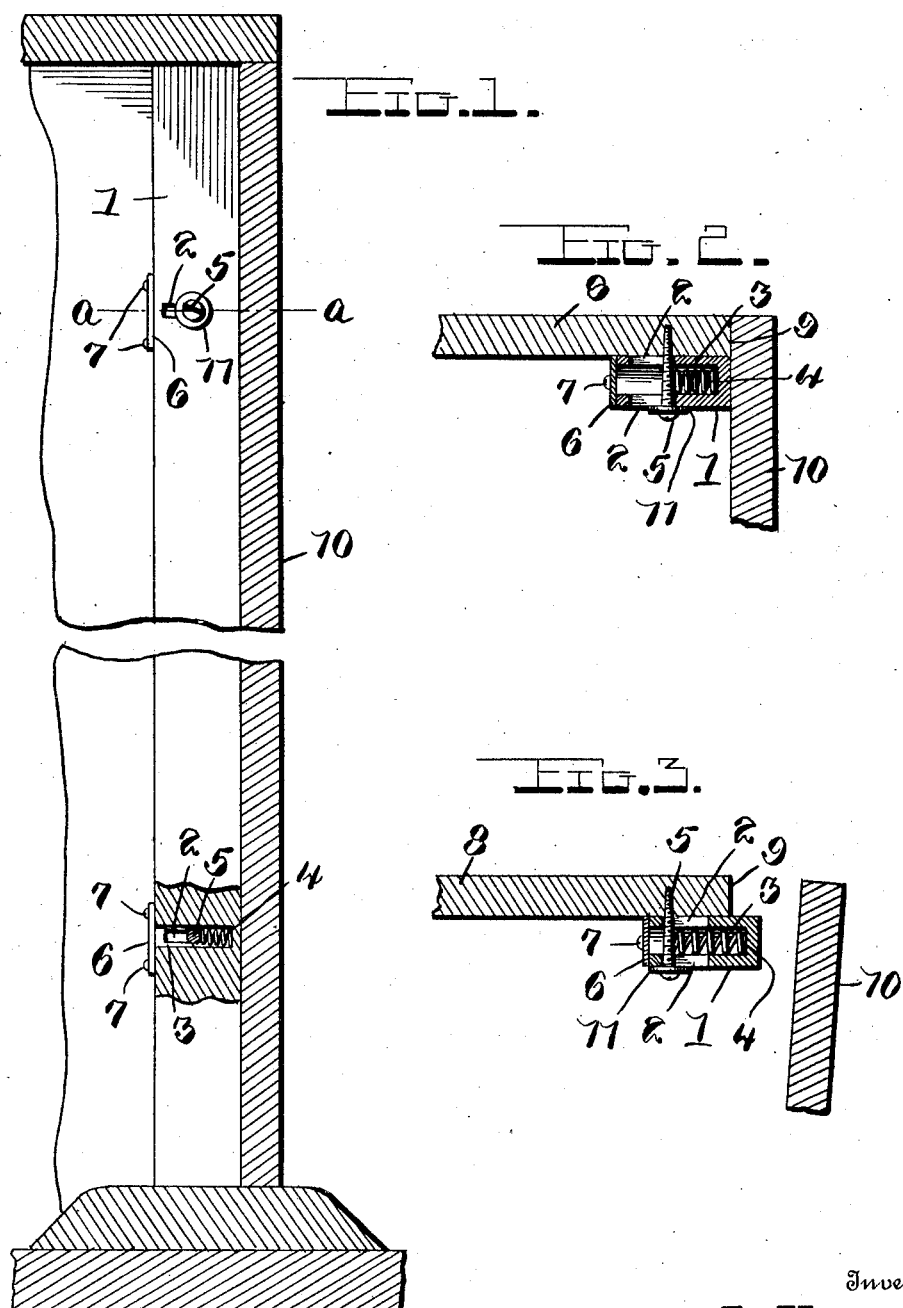

LEVI KNOTT, OF ALTOONA, PENNSYLVANIA.

WEATHER-STRIP.

998,346.   Specification of Letters Patent.   Patented July 18, 1911.

Application filed October 29, 1910. Serial No. 589,740.

*To all whom it may concern:*

Be it known that I, LEVI KNOTT, a citizen of the United States, residing at Altoona, in the county of Blair and State of Pennsylvania, have invented certain new and useful Improvements in Weather-Strips, of which the following is a specification, reference being had to the accompanying drawings.

This invention is an improved weather strip for use at one side of the casing of a door or the like to close the crack at that side of the door, when the door is closed, the object of the invention being to provide an improved weather strip of this character which may be readily attached to a door casing or frame and which operates to effect a tight joint with the door when the latter is closed.

The invention consists in the construction, combination and arrangement of devices hereinafter described and claimed.

In the accompanying drawings, Figure 1 is a vertical sectional view of a door and door frame, showing one of my improved weather strips attached to one side of the door frame, the said weather strip being indicated partly in elevation and partly in section; Fig. 2 is a transverse sectional view on the plane indicated by the line *a—a* of Fig. 1 and showing the door closed; and Fig. 3 is a similar view on the same plane with the door open.

My improved weather strip 1 which may be made of wood or of any other suitable material is provided at suitable points with slots 2 which extend partly across the same. These slots are intersected by recesses 3 which extend from the rear or inner edge of the strip nearly to the outer or front edge thereof and in the said recesses are coiled springs 4. Screws 5 extend through the slots 2 and form the means for attaching the weather strip, the said springs bearing between the inner ends of the recesses 3 and the said screws 5. Plates 6 are employed to close the ends of the recesses 3 and are secured on the rear or inner edge of the weather strip by means of screws 7 which enable the said plates to be readily detached.

For the purposes of this specification I show the weather strip 1 attached by the screws 5 to one of the jambs or sides of the door frame 8, the screws being so located that the springs 4 when the door is opened move the weather strip outwardly so that its front or outer edge projects a slight distance beyond the shoulder 9 of the jambs. When the door 10 is closed it first engages the strip 1 and the strip is moved against the tension of the springs 4 as the door closes in the jamb, the said springs serving to maintain the strip in close engagement with the door and causing the weather strip to effectually close the crack between the door and the jamb, as will be understood.

By first removing the screws 5 and then removing the plates 6 the springs 4 may be removed and hence my improved weather strip affords access to the springs employed to operate the same and enables the springs to be readily renewed in the event that they become impaired or broken.

I employ washers 11 on the screws 5 and bearing against the outer side of the weather strip to cover the slots 2 and prevent dirt and foreign substances from entering the slots and clogging the springs.

It will be understood that my improved weather strip may be readily manufactured at slight cost and that it may be very readily and expeditiously attached to or detached from a door or other frame.

Having thus described the invention what is claimed is:—

1. A weather strip of the class described having transverse openings, recesses intersecting the said openings and extending to the rear edge of said weather strip, attaching devices extending through said transverse openings, springs in the said recesses bearing against the said attaching devices, and plates on the said strip covering the ends of said recesses, said plates being removable from the strip.

2. A weather strip of the class described having transverse openings, recesses intersecting the said openings and extending to the rear edge of said weather strip, attaching devices extending through said transverse openings, springs in the said recesses bearing against the said attaching devices, and plates on the said strip covering the ends of said recesses, said plates being removable from the strip, the said attaching devices having means to close the said transverse openings.

In testimony whereof I hereunto affix my signature in the presence of two witnesses.

LEVI KNOTT.

Witnesses:
P. M. SWANGER,
WALTER J. HENRY.

Copies of this patent may be obtained for five cents each, by addressing the "Commissioner of Patents, Washington, D. C."